July 14, 1953    J. R. STANFIELD ET AL    2,645,519
ROAD VEHICLE BODY OF CHASSISLESS TYPE
Filed June 23, 1950    2 Sheets-Sheet 1
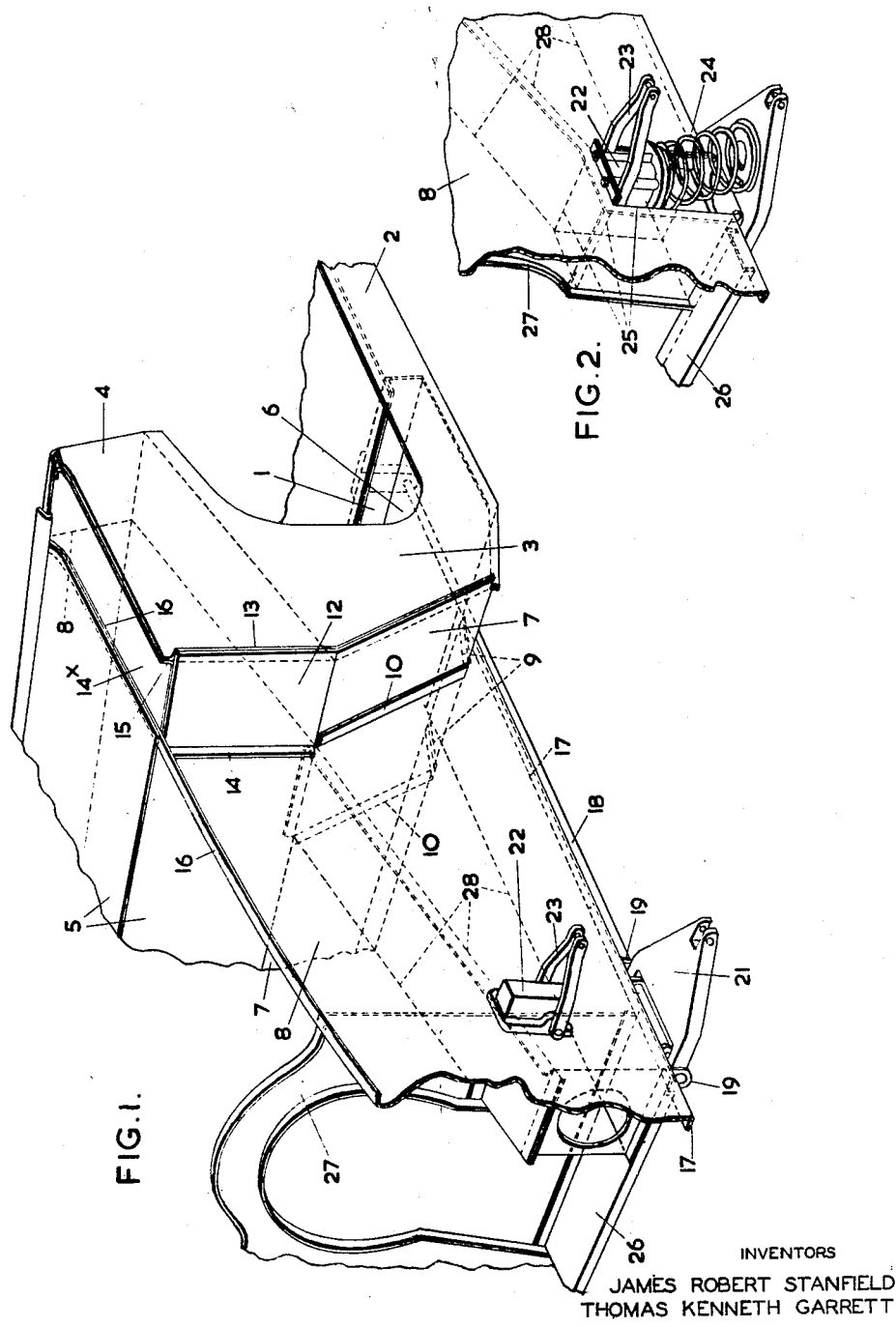
INVENTORS
JAMES ROBERT STANFIELD
THOMAS KENNETH GARRETT
BY
A. Yates Dowell
ATTORNEY July 14, 1953  J. R. STANFIELD ET AL  2,645,519
ROAD VEHICLE BODY OF CHASSISLESS TYPE
Filed June 23, 1950  2 Sheets-Sheet 2

INVENTORS
JAMES ROBERT STANFIELD
THOMAS KENNETH GARRETT

BY
ATTORNEY

Patented July 14, 1953

2,645,519

UNITED STATES PATENT OFFICE 2,645,519

ROAD VEHICLE BODY OF CHASSISLESS TYPE

James R. Stanfield, Birmingham, and Thomas K. Garrett, Rubery, near Birmingham, England, assignors to The Austin Motor Company Limited, Birmingham, England Application June 23, 1950, Serial No. 169,890
In Great Britain June 27, 1949

7 Claims. (Cl. 296—28)

This invention relates to the bodies of chassisless road vehicles, that is to say vehicles in which the body itself serves as the chassis as distinguished from those having a separate chassis frame upon which the body is mounted and secured.

In chassisless road vehicle bodies as hitherto constructed the door sills, usually of box section, have been formed with fore and aft extensions which are inwardly offset to pass inside the front and rear road wheels and to carry the wheel suspensions. This known construction has the disadvantage that the inward offsetting or cranking of the sill extensions causes the vertical bending loads upon the latter to be transferred to the sills partly as longitudinal bending loads and partly as transverse torsional loads which subject the body structure to lateral strains and distortion.

In a vehicle body of the kind referred to and according to the present invention, the vertical bending loads upon longitudinally disposed members, which pass inside the wheels and carry or are connected to the wheel suspensions, are transferred to the sides of the body or the sills through transversely disposed torsion boxes, one for each such member, or through the opposite end portions of a torsion box which is common to two such members associated with a pair of road wheels. The torsion box or boxes would preferably have as large a cross-sectional area as practicable and of any convenient shape with re-entrant angles avoided as far as possible.

The invention can be applied to either the front or rear end of the vehicle, or both, and any transverse torsion box may, if necessary or desirable, have openings therein to enable the interior of the box to be used for housing accessories, or to permit the passage of controls or wiring. The marginal portions of any such opening in the box wall would preferably be flanged, and internal or external stiffening members may be provided.

The invention will now be more fully described with reference to the embodiments shown, by way of examples, in the accompanying drawings, in which:

Fig. 1 is a fragmentary perspective view showing an application of the invention to one of the independent front wheel suspensions of an automobile, said suspension being of the torsion rod type.

Fig. 2 is a fragmentary perspective view showing an application of the invention to an independent front wheel suspension of the helical spring type.

Figure 3:
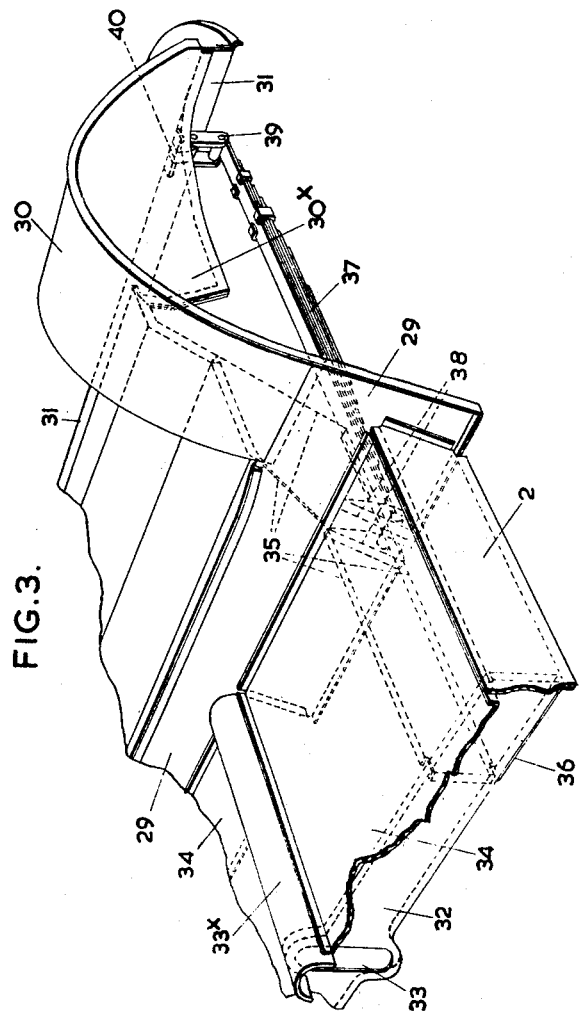
Fig. 3 is a fragmentary perspective view of an application of the invention to a rear wheel suspension of the multiple leaf spring type.

Referring to Figs. 1 and 2 of the drawings, each end of the front seat brace 1 is welded to the adjacent sill plate 2 of the automobile body, and each sill plate 2, at its forward end, extends upwardly to constitute a side 3 of the dash structure and then rearwardly to form an end wall 4 of a transverse torsion box 5 which extends fully across the dash. The forward floor plate 6 is welded along its rear edge to the transverse front seat brace 1, at its ends to the respective sill plates 2 and along its forward edge to the lower edge of the toe board plate 7, the upper edge of the latter plate being welded to the front bottom corner of the torsion box 5 throughout its length.

Appropriately distanced inwardly from each end of the torsion box 5 is a longitudinally disposed panel or flitch plate 8 arranged vertically on edge, the two flitch plates 8, which between them carry the engine (not shown), being parallel to each other and extending forwardly from the dash structure forming a cantilever supporting beam. Each flitch plate 8 has its lower rear end portion formed with flanges 9, 10 which are welded to a forward, upwardly inclined portion of the front floor plate 6 and the steeply inclined toe board plate 7, whilst the upper rear end portion of each flitch plate 8 extends rearwardly into the torsion box 5 to form a diaphragm therein distanced from the adjacent end wall 4, the diaphragm portion of each flitch plate 8 being welded along its upper, rear and bottom edges to the top, rear and bottom side walls respectively of the torsion box 5 and also to the front wall of said box. In this connection, the outer end portions of the front wall of the torsion box 5 are afforded by separate plates 12 which are welded to lateral flanges 13 on the forward vertical edges of the walls 4 and have their inner vertical edges formed with flanges 14 which are welded to the outer sides of the flitches 8, and the outer ends of the main or central portion of said front wall would be similarly flanged for welding connection to the inner sides of the flitches 8. Also the outer end portions of the top wall of the torsion box 5 are afforded by separate plates 14$^x$ which have flanged outer edges 15 for welding connection to the adjacent walls 4 and at their inner edges are welded to a lateral outward flange 16 on the upper edge of the respective flitch 8, which flange 16 is also welded to the end edge of the main or outer portion of said top wall of the torsion box 5. The lower horizontal edge of each flitch 8 is formed with a lateral inward flange 17 along its full length.

In Fig. 1 the independent suspension for each front wheel comprises a torsion rod 18 anchored at its rear end to the front seat brace 1 and extending forwardly below the flitch 8 and through front bearings 19 in which, or at least the rear one of which, the said rod is free to turn, said bearings being fixed to the bottom flange 17 of the flitch 8. The forward end portion of the torsion rod 18 has fixed thereon the wishbone 21 for the wheel axle, whilst above this and fixed to the outer side face of the flitch 8 is a shock absorber 22 the pivoted arm 23 of which controls the vertical movements of the wheel.

In Fig. 2 the independent suspension for each front wheel comprises a helical spring 24 operating between the pivoted wishbone 21 and the arm 23 of a shock absorber 22. The shock absorber 22 and spring 24 are accommodated in a housing 25 fixed to the flitch 8 on its inner side, the flitch 8 having a cut away portion to afford an open outer side to said housing.

In either of the above described arrangements the bending loads taken off the flitches 8 are transmitted outwardly through the opposite end portions of the torsion box 5 and through the dash sides 3 to the sills 2 of the body.

As the torsion box 5 extends fully across the body it affords torsional stiffness thereto as a whole. If, however, such torsional stiffness is provided by other means, the centre portion of the torsion box may be dispensed with so that there are then, in fact, separate torsion boxes, one at either side, the inner end walls of the two torsion boxes being constituted by the upper rear portions of the flitches, which flitch portions, in the full width torsion box, comprise the diaphragms.

By obviating the need for inwardly offset sill extensions or outwardly inclined or tapering front flitches, the tendency to develop lateral shaking in the dash structure is avoided or materially reduced, and a much higher degree of stiffness and strength, with accompanying reduction in weight, can be obtained than heretofore.

Toward their forward ends, and at or near the vertical axial plane of the front wheels, the flitches 8 are interconnected by a front brace 26 and an engine bulkhead 27, whilst each flitch 8 has associated therewith a longitudinal torsion box 28. These members 26, 27 and 28 are subsidiary members which stiffen the flitches 8, and they form the subject of a co-pending application of even date, Serial No. 169,904.

Referring now to Fig. 3 of the drawings the rear end of each sill plate 2 is flanged and is welded to the rear seat brace plate 29 which extends fully across the body and has welded to the end portions of its upper edge the forward ends of the rear wheel arches 30, the rear ends of which are interconnected by a rear cross bracing member 31. The sill plates 2 are also interconnected, at a position forwardly of the rear seat brace 29, by a cross-member 32 which has a central clearance slot at 33 for the propeller shaft which is covered by the usual tunnel plate 33ˣ, whilst rear floor plates 34 welded to the cross member 32 have flanged outer edges welded to the upper edges of the sill plates 2, flanged inner edges welded to the tunnel plate 33ˣ and flanged rear edges welded to the rear seat brace 29.

The inner panel or skirt portion 30ˣ of each wheel arch 30, usually referred to as the "inner wheel arch" is formed with a forward extension 35 which passes through a slit in the rear seat brace 29 and has a flanged upper edge welded to the floor plate 34, a flanged vertical forward edge welded to the cross member 32 and a flanged bottom edge. The skirt portion 30ˣ and forward portion 35 form a panel corresponding to the flitch plate or panel 8 of the first modification. This inner wheel arch extension 35 is distanced inwardly from and is parallel to the sill plate 2, and a bottom plate 36 is welded at its respective edges, some of which are flanged, to the lower edge of the sill plate 2, the lower edge of the inner wheel arch extension 35, the rear seat brace 29 and the lower edge of the cross member 32.

The multiple leaf spring 37 for each of the rear wheels is connected at its forward end to brackets 38 welded to the rear side of the rear seat brace 29 and, at its rear end, to spring shackles 39 connected by brackets 40 to the rear cross bracing member 31, the spring attachments being disposed close to the vertical plane of the inner wheel arch 30.

The rear portion of each sill plate 2 and the confronting portion of the inner wheel arch extension 35 constitute the end walls of a torsion box the other walls of which are afforded by the bottom plate 36 and the interconnecting or interposed portions of the cross member 32, rear seat brace 29 and floor plate 34.

The two torsion boxes, associated one with each rear wheel suspension, carry the bending loads outwardly from the inner wheel arches 30ˣ to the sill plates 2. The torque due to lateral inward displacement of the inner wheel arches 30ˣ from the body sides or sills 2 will be taken by the cross member 32 the end portions of which constitute the forward walls of the two torsion boxes.

The invention secures the advantage that the body sides or sills can be substantially straight, thus simplifying production, and it obviates the need for taking torsion in the long length of the sills and thus gives rise to a stiffer body structure as a whole.

Having fully described our invention, what we claim and desire to secure by Letters Patent is:

1. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, means interconnecting said panels for maintaining them in fixed relation, a pair of upstanding sill plates, each positioned laterally outwardly of and overlapping an inner portion of the corresponding panel and spaced therefrom an amount to provide a wheel receiving recess, a transversely extending plate member extending between said sill plates and fixedly secured to the sill plates and the panels, means including said overlapping portions of the corresponding sill plate and panel forming torsion boxes including top, bottom and end walls extending between the corresponding panel and sill plate and forming therewith the substantially closed torsion boxes, said transversely extending plate member forming at least one of said walls of said torsion box, and means secured to each of said panels adjacent the outer end thereof for supporting a wheel suspension means therefrom.

2. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, means interconnecting said panels for maintaining them in fixed relation, a pair of upstanding sill plates, each positioned laterally outwardly of and overlapping an inner portion of the corresponding panel and spaced therefrom an amount to provide a wheel receiving recess, means interconnecting the sill plates and maintaining them in fixed relation, means including said overlapping portions of the corresponding sill plates and panels forming torsion boxes including top, bottom and end walls extending between the corresponding panels and sill plates and forming therewith the substantially closed torsion boxes, and means secured to each of said panels adjacent the outer end thereof for supporting a wheel suspension means therefrom.

3. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, means interconnecting said panels for maintaining them in fixed relation, a pair of upstanding sill plates with upwardly extending portions, each sill plate positioned laterally outwardly of and having its upwardly extending portion overlapping an inner portion of the corresponding panel and spaced therefrom an amount to provide a wheel receiving recess, a transversely extending plate member extending between said upwardly extending portion of said sill plates and fixedly secured to said sill plates and said panels, means including said overlapping portions of the corresponding sill plates and panels forming torsion boxes including top, bottom and end walls extending between the corresponding panels and sill plates and forming therewith the substantially closed torsion boxes, said transversely extending plate member forming at least one of said walls of said torsion boxes and means secured to each of said panels adjacent the outer end thereof for supporting a wheel suspension means therefrom.

4. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, means interconnecting said panels for maintaining them in fixed relation, a pair of upstanding sill plates with upwardly extending portions, each sill plate positioned laterally outwardly of and having its upwardly extending portion overlapping an inner portion of the corresponding panel and spaced therefrom an amount to provide a wheel receiving recess, a toe board plate interconnecting the sill plates and the panels and fixedly secured to each panel and sill plate, means including said overlapping portions of the corresponding sill plate and panel forming torsion boxes including top, bottom and end walls extending between the corresponding panel and sill plate and forming therewith substantially closed torsion boxes, and means secured to each of said panels adjacent the outer ends thereof for supporting a wheel suspension means therefrom.

5. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, a seat brace plate member interconnecting the panels and projecting laterally outwardly of the panels for maintaining them in fixed relation, a pair of upstanding sill plates, each positioned laterally outwardly of and overlapping an inner portion of the corresponding panel and spaced therefrom an amount to provide a wheel receiving recess, means including said overlapping portions of the corresponding sill plates and panels forming torsion boxes including top, bottom and end walls extending between the corresponding panel and sill plate and forming therewith the substantially closed torsion boxes, said seat brace plate member forming at least one of said walls of said torsion boxes, and means secured to each of said panels adjacent the outer end thereof for supporting a wheel suspension means therefrom.

6. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, a seat brace plate member interconnecting the panels and projecting laterally outwardly of the panels for maintaining them in fixed relation, a pair of upstanding sill plates, each positioned laterally outwardly of and overlapping an inner portion of the corresponding panel and spaced therefrom an amount to provide a wheel receiving recess, means including said overlapping portions of the corresponding sill plates and panels forming torsion boxes including top, bottom and end walls extending between the corresponding panel and sill plate and forming therewith the substantially closed torsion boxes, said seat brace plate member forming at least one of said walls of said torsion box, a bracing member extending between the rear portions of said panels and fixed thereto, said seat brace plate member and bracing member providing the means for supporting wheel suspension.

7. A road vehicle body structure comprising a pair of upstanding panels arranged in spaced face to face relation for disposition between the wheels of a vehicle and comprising inner longitudinal walls of a pair of wheel housings with one end of each of said panels extending outwardly of the body and forming a cantilever supporting beam for supporting the body from a spring suspension adjacent the outer end of each panel, a seat brace plate member interconnecting the panels and projecting laterally outwardly of the panels for maintaining them in fixed relation, a pair of upstanding sill plates, each positioned laterally outwardly of and overlapping an inner portion of the corresponding panel and spaced therefrom an amount to provide a wheel receiving recess, a cross member interconnecting said sill plates and spaced from said seat brace substantially the amount of the overlap of said panels and sill plates, means including said overlapping portions of the corresponding sill plates, panels, seat brace plate and cross member forming torsion boxes including top, bottom and end walls extending between the corresponding panel and sill plate and forming therewith the substantially closed torsion boxes, said seat brace plate and cross member forming two of the said walls of said torsion boxes.

JAMES R. STANFIELD.
THOMAS K. GARRETT.

References Cited in the file of this patent

UNITED STATES PATENTS

| Number | Name | Date |
|---|---|---|
| 2,100,561 | Kliesrath | Nov. 30, 1937 |
| 2,157,649 | Eksergian | May 9, 1939 |
| 2,488,978 | Julien et al. | Nov. 22, 1949 |
| 2,551,528 | Darrin | May 1, 1951 |

FOREIGN PATENTS

| Number | Country | Date |
|---|---|---|
| 497,190 | Germany | May 3, 1930 |
| 773,590 | France | Sept. 3, 1934 |